US007165872B2

(12) United States Patent
Suzuki et al.

(10) Patent No.: US 7,165,872 B2
(45) Date of Patent: Jan. 23, 2007

(54) VEHICLE HEADLAMP

(75) Inventors: Eiji Suzuki, Isehara (JP); Yasuhiro Ohkubo, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 61 days.

(21) Appl. No.: 11/045,591

(22) Filed: Jan. 31, 2005

(65) Prior Publication Data

US 2005/0213340 A1 Sep. 29, 2005

(30) Foreign Application Priority Data

Feb. 2, 2004 (JP) ............................ 2004-026001

(51) Int. Cl.

| | |
|---|---|
| ***B60Q 1/00*** | (2006.01) |
| ***F21V 7/06*** | (2006.01) |
| ***F21V 14/00*** | (2006.01) |
| ***F21V 14/08*** | (2006.01) |

(52) U.S. Cl. ...................... 362/538; 362/518; 362/523; 362/539

(58) Field of Classification Search ................ 362/514, 362/516–518, 538, 296, 297, 298, 303, 327–328, 362/341, 346, 347, 350
See application file for complete search history.

(56) References Cited

U.S. PATENT DOCUMENTS

| | | | |
|---|---|---|---|
| 5,060,120 A * | 10/1991 | Kobayashi et al. | ......... 362/465 |
| 2002/0186565 A1 * | 12/2002 | Taniuchi et al. | ............ 362/297 |

FOREIGN PATENT DOCUMENTS

| | | |
|---|---|---|
| JP | 2002-324413 A | 11/2002 |

* cited by examiner

*Primary Examiner*—Sandra O'Shea
*Assistant Examiner*—Guiyoung Lee
(74) *Attorney, Agent, or Firm*—Foley & Lardner LLP

(57) ABSTRACT

A headlamp includes a sub-reflector between a main reflector and a projection lens. The sub-reflector has a sub-reflection surface in a form of a paraboloid of revolution. The sub-reflector is movable between a low-beam posture and a high-beam posture. The sub-reflector forms a diffused light distribution pattern superposes the pattern on a low-beam light distribution pattern produced by the main reflector when the sub-reflector is in the low-beam posture and forms a condensed light distribution pattern and superposes the pattern on a high-beam light distribution pattern formed by the main reflector when the sub-reflector is in the high-beam posture.

7 Claims, 10 Drawing Sheets

VEHICLE HEADLAMP

CROSS-REFERENCE TO RELATED APPLICATIONS

The present document incorporates by reference the entire contents of Japanese priority document, 2004-026001 filed in Japan on Feb. 2, 2004.

BACKGROUND OF THE INVENTION

1. Field of the Invention

The present invention relates to a projector-type vehicle headlamp.

2. Description of the Related Art

A projector-type headlamp that effectively uses a part of light from the light source, which normally becomes useless, has been disclosed in, for example, Japanese Patent Application Laid-Open No. 2002-324413 (see FIGS. 12 and 13). This headlamp includes a discharge bulb (22), a reflector (24) having a reflection surface (24*a*), a rotatably supported shade (72), a shade drive (34), a projection lens (28), a first additional reflector (36) having a reflection surface (36*a*), a second additional reflector (74) rotatably supported and having a reflection surface (74*a*), and a second additional reflector drive.

The shade (72) is positioned at a shading position, and the second additional reflector (74) is positioned downward. At this time, the light from the discharge bulb (22) is reflected by the reflection surface (24*a*) of the reflector (24), and a part of the reflected light is cut off by the shade (72), and the remaining reflected light passes through the projection lens (28) and is irradiated outward in a low-beam light distribution pattern (P(L)). On the other hand, a part of light from the discharge bulb (22), which normally becomes useless, is reflected by the reflection surface (36*a*) of the first additional reflector (36), and the reflected light is diffuse-reflected in the horizontal direction by the reflection surface (74*a*) of the second additional reflector (74), to form a downward and oblong additional light distribution pattern (P(A)). The downward and oblong additional light distribution pattern (P(A)) is superposed on the low-beam light distribution pattern (P(L)).

Furthermore, the shade (72) is positioned at a light transmitting position, and the second additional reflector (74) is positioned upward. At this time, the light from the discharge bulb (22),is reflected by the reflection surface (24*a*) of the reflector (24), and the reflected light passes through the projection lens (28) and is irradiated outward in a high-beam light distribution pattern (P(H)). On the other hand, the part of light from the discharge bulb (22), which normally becomes useless, is reflected by the reflection surface (36*a*) of the first additional reflector (36), and the reflected light is diffuse-reflected in the horizontal direction by the reflection surface (74*a*) of the second additional reflector (74), to form an upward and oblong additional light distribution pattern (P(A)). The upward and oblong additional light distribution pattern (P(A)) is superposed on the high-beam light distribution pattern (P(H)).

Thus, the headlamp effectively uses the light from the discharge bulb (22), which normally becomes useless. In other words, the headlamp can obtain a light distribution pattern in which the downward and oblong additional light distribution pattern (P(A)), which effectively uses the useless light, is superposed on the low-beam light distribution pattern (P(L)), and a light distribution pattern in which the upward and oblong additional light distribution pattern (P(A)), which effectively uses the useless light, is superposed on the high-beam light distribution pattern (P(H)).

However, the conventional headlamp simply uses the partial light from the discharge bulb (22), which normally becomes useless, as the oblong additional light distribution pattern (P(A)). Therefore, in the conventional headlamp, the position of the oblong additional light distribution pattern (P(A)) obtained by effectively using the useless light is changed up and down. However, there is a problem such that the shape and action (diffusing action and condensing action) of the oblong additional light distribution pattern (P(A)) itself does not change.

SUMMARY OF THE INVENTION

It is an object of the present invention to at least solve the problems in the conventional technology.

A projector-type headlamp according to an aspect of the present invention includes a light source that outputs light; a main reflection surface in a form of an ellipsoid of revolution, wherein the main reflection surface reflects a part of the light output by the light source, the main reflection surface having a first focal point and a second focal point; the light source arranged near the first focal point; a shading unit that is located near the second focal point, wherein the shading unit is movable between a first posture and a second posture, wherein a low-beam light distribution pattern is formed when the shading unit is in the first posture and a high-beam light distribution pattern with the remaining reflected light is formed when the shading unit is in the second posture; a projection lens that projects forward the low-beam light distribution pattern and the high-beam light distribution pattern; a sub-reflector that is arranged between the main reflector and the projection lens and has a sub-reflection surface in a form of a paraboloid of revolution with a point near the first focal point as a focal point, wherein the sub-reflector reflects a part of light, which does not enter into the main reflection surface and normally becomes useless, from the light source, and the sub-reflector is movable between a third posture and a fourth posture, wherein a diffused light distribution pattern is formed and superposed on the low-beam light distribution pattern projected forward from the projection lens when the sub-reflector is in the third posture and a condensed light distribution pattern is formed and superposed on the high-beam light distribution pattern projected forward from the projection lens when the sub-reflector is in the fourth posture; and a switching unit that performs switching of the shading unit between the first posture and the second posture and switching of the sub-reflector between the third posture and the fourth posture.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be explained below in detail with reference to the accompanying drawings. Note that the invention is not limited by the embodiments.

The configuration of the headlamp according to a first embodiment will be explained with reference to FIGS. 1 to 13. Throughout the drawings, reference sign "VU-VD" denotes a vertical line on a screen. - Reference sign "HL-HR" denotes a horizontal line on the screen. Reference sign "F" denotes the front side of a car C (traveling direction of the car C). Reference sign "B" denotes the rear side of the car C. Reference sign "U" denotes upward, viewed from a driver. Reference sign "D" denotes downward, viewed from the driver. Reference sign "L" denotes the left side, as the front F is viewed from the driver sees. Reference sign "R" denotes the right side, as the front F is viewed from the driver sees. The "front, rear, below, left, and right" in the appended claims have the same meaning as those described in the specification and the drawings. In the specification and the accompanying drawings, an example in which the car C is on the left-hand traffic is explained. In the case of the right-hand traffic, the shape of an edge of the shade and the shape of the light distribution pattern are reversed from left to right.

Figure 10A:
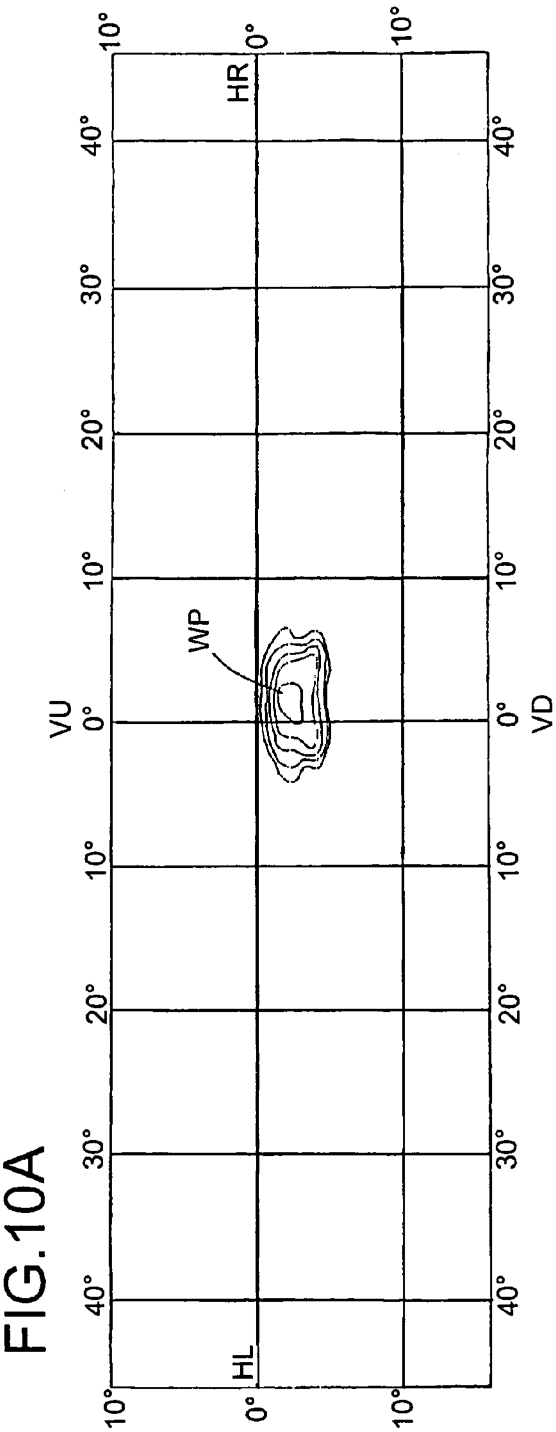
FIG. 10A is an explanatory diagram of an equi-intensity curve of light, in which the diffused light distribution pattern on the screen obtained by computer simulation is shown in a simplified manner.
Figure 10B:
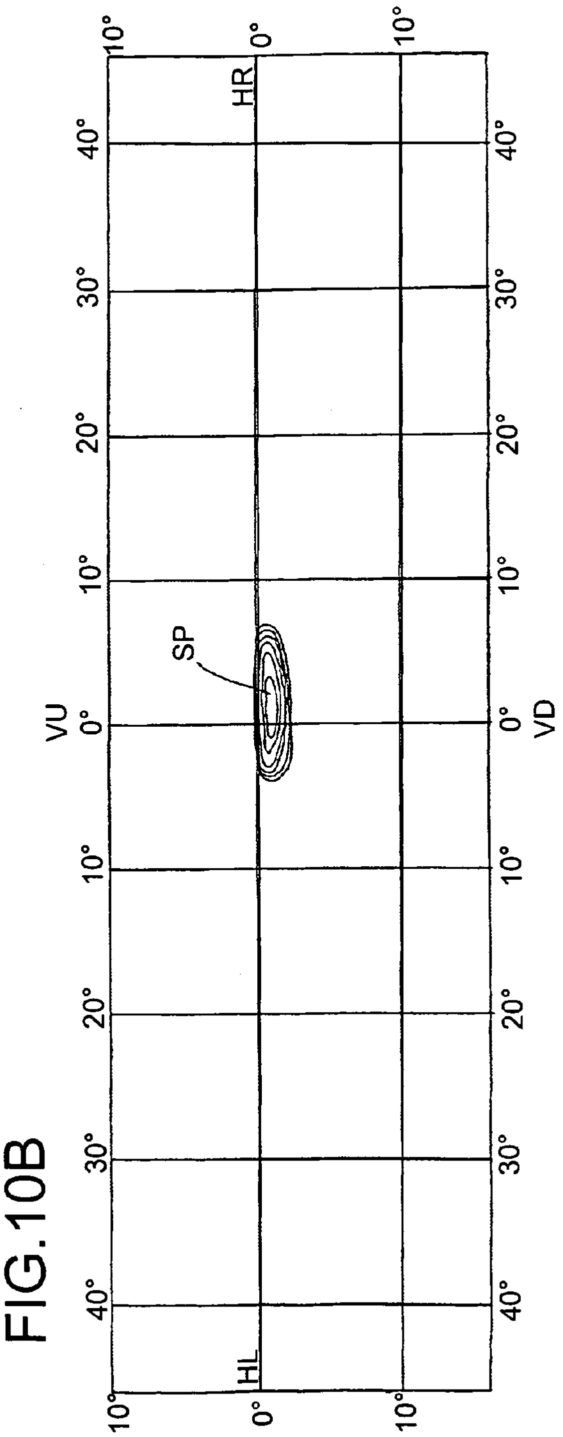
FIG. 10B is an explanatory diagram of an equi-intensity curve of light, in which the condensed light distribution pattern on the screen obtained by computer simulation is shown in a simplified manner.

FIG. 10A is an explanatory diagram of an equi-intensity curve of light, in which the diffused light distribution pattern WP on the screen obtained by computer simulation is shown in a simplified manner. In the pattern WP, the egui-intensity curve of light at the center indicates 5000 (cd), and the other egui-intensity curves of light respectively indicate 2000 candles (cd), 1000 cd, 500 cd, and 200 cd toward the outside. FIG. 10B is an explanatory diagram of an equi-intensity curve of light, in which a condensed light distribution pattern SP on the screen obtained by computer simulation is shown in a simplified manner; In the pattern SP, the egui-intensity curve of light at the center indicates 10000 cd, and the other egui-intensity curves of light respectively indicate 5000 cd, 2000 cd, 1000 cd, 500 cd, and 200 cd toward the outside.

Figure 11A:
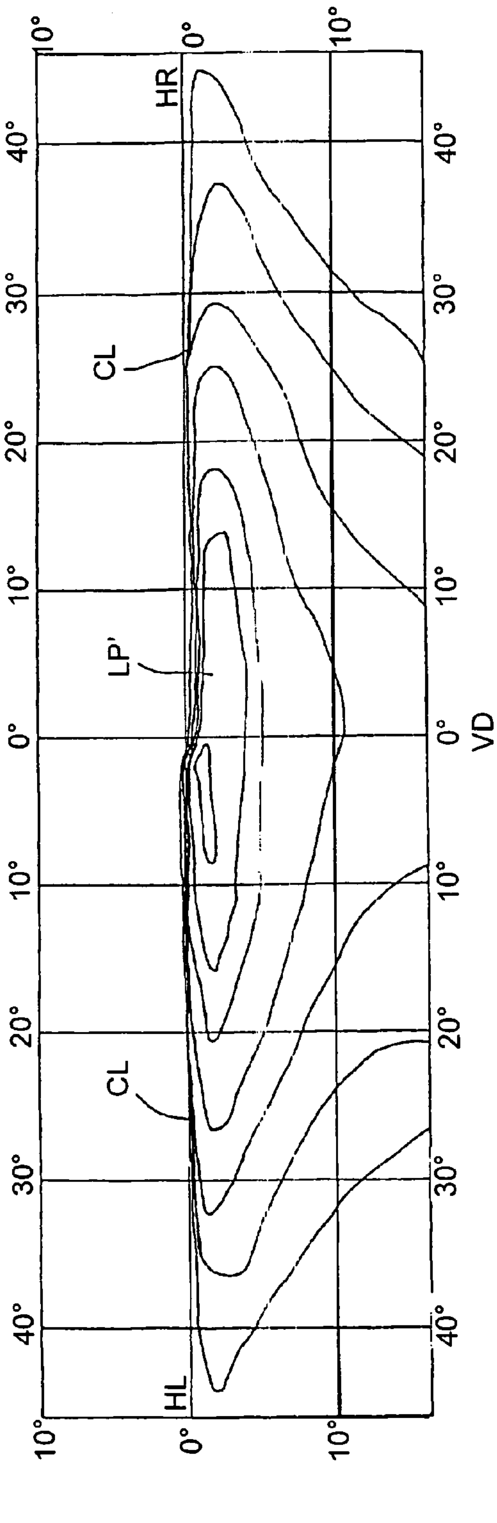
FIG. 11A is an explanatory diagram of an equi-intensity curve of light, in which an optimum low-beam light distribution pattern on the screen obtained by computer simulation is shown in a simplified manner.
Figure 11B:
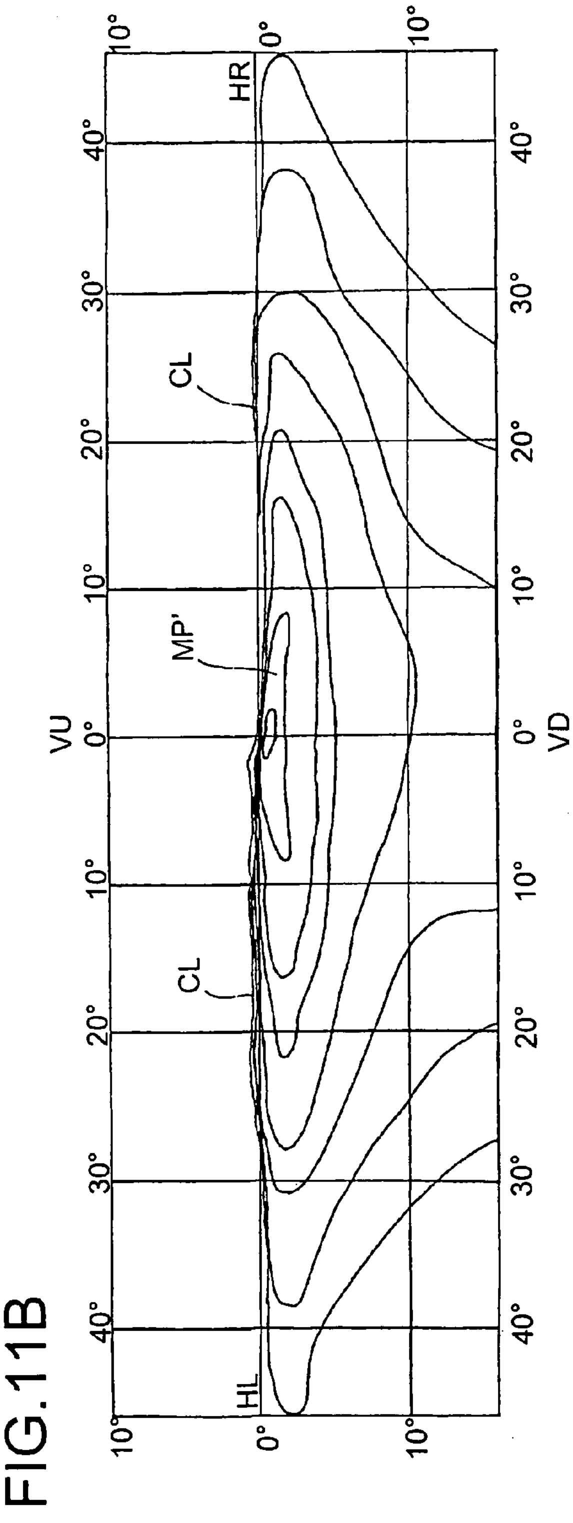
FIG. 11B is an explanatory diagram of an equi-intensity curve of light, in which an optimum motorway light distribution pattern on the screen obtained by computer simulation is shown in a simplified manner.

FIG. 11A is an explanatory diagram of an equi-intensity curve of light, in which an optimum low-beam light distribution pattern LP' on the screen obtained by computer simulation is shown in a simplified manner. In the pattern LP', the egui-intensity curve of light at the center indicates 20000 cd, and the other egui-intensity curves of light respectively indicate 10000 cd, 5000 cd, 2000 cd, 1000 cd, 500 cd, and 200 cd toward the outside. FIG. 11B is an explanatory diagram of an equi-intensity curve of light, in which an optimum motorway light distribution pattern MP' on the screen obtained by computer simulation is shown in a simplified manner. In the pattern MP', the egui-intensity curve of light at the center indicates 50000 cd, and the other egui-intensity curves of light respectively indicate 20000 cd, 10000 cd, 5000 cd, 2000 cd, 1000 cd, 500 cd, and 200 cd toward the outside.

Figure 12A:
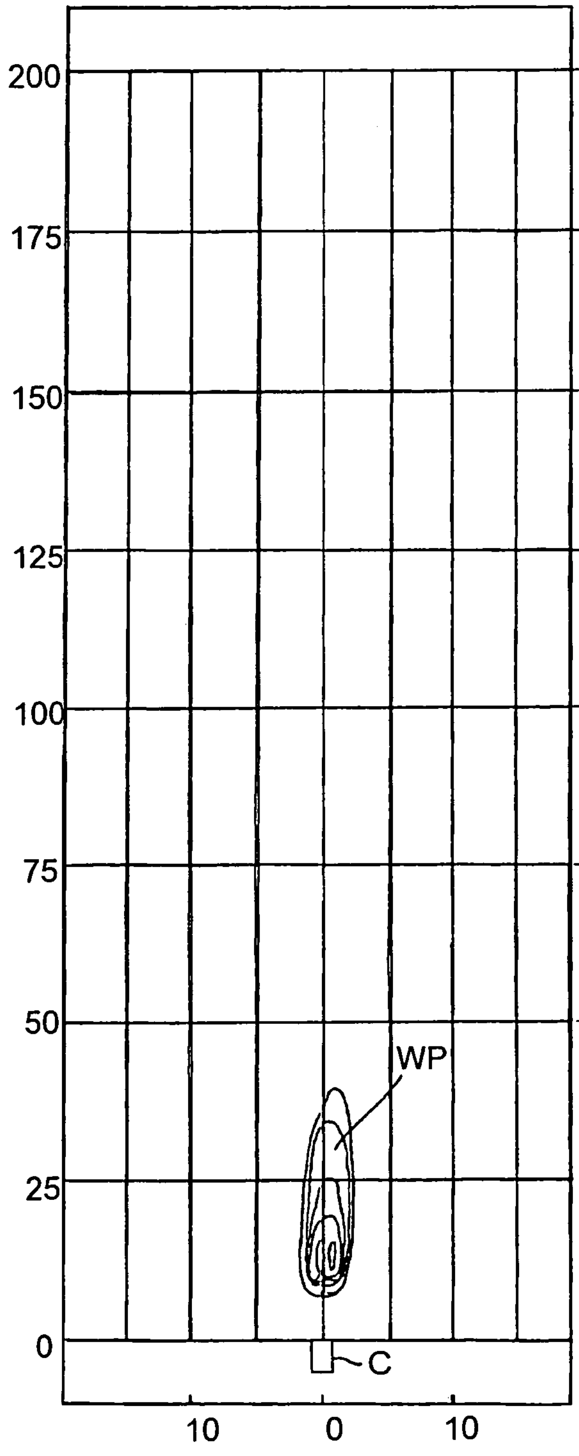
FIG. 12A is a plan explanatory diagram of an equiluminous curve of light, in which the diffused light distribution pattern on the road obtained by computer simulation is shown in a simplified manner.
Figure 12B:
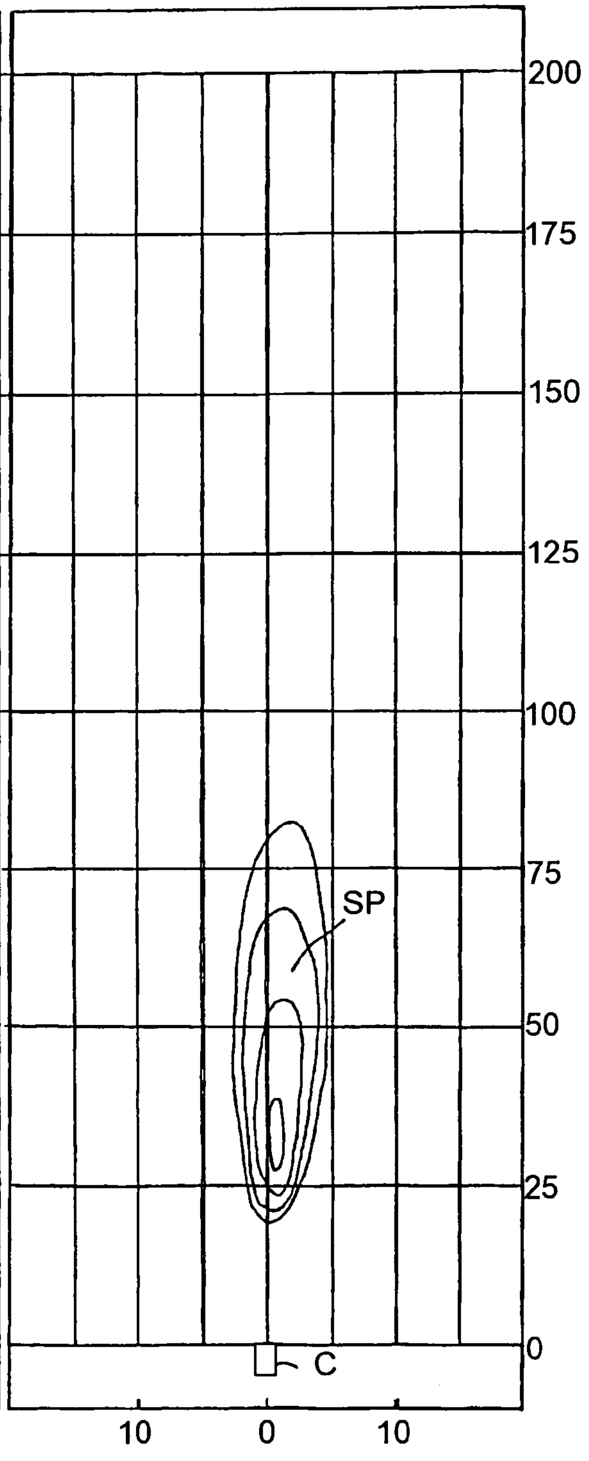
FIG. 12B is a plan explanatory diagram of an equiluminous curve of light, in which the condensed light distribution pattern on the road obtained by the computer simulation is shown in a simplified manner.

FIG. 12A is a plan explanatory diagram of an equiluminous curve of light, in which the diffused light distribution pattern WP on the road obtained by computer simulation is shown in a simplified manner. In the pattern WP, an equiluminous curve at the center indicates 30 (lx), and the other equiluminous curves respectively indicate 20 (lx), 10 (lx), 5 (lx), and 3 (lx) toward the outside. FIG. 12B is a plan explanatory diagram of an equiluminous curve of light, in which the condensed light distribution pattern SP on the road obtained by the computer simulation is shown in a simplified manner. In the pattern SP, an equiluminous curve at the center indicates 20 (lx), and the other equiluminous curves respectively indicate 10 (x), 5 (lx), and 3 (lx) toward the outside.

Figures 13A, 13B:
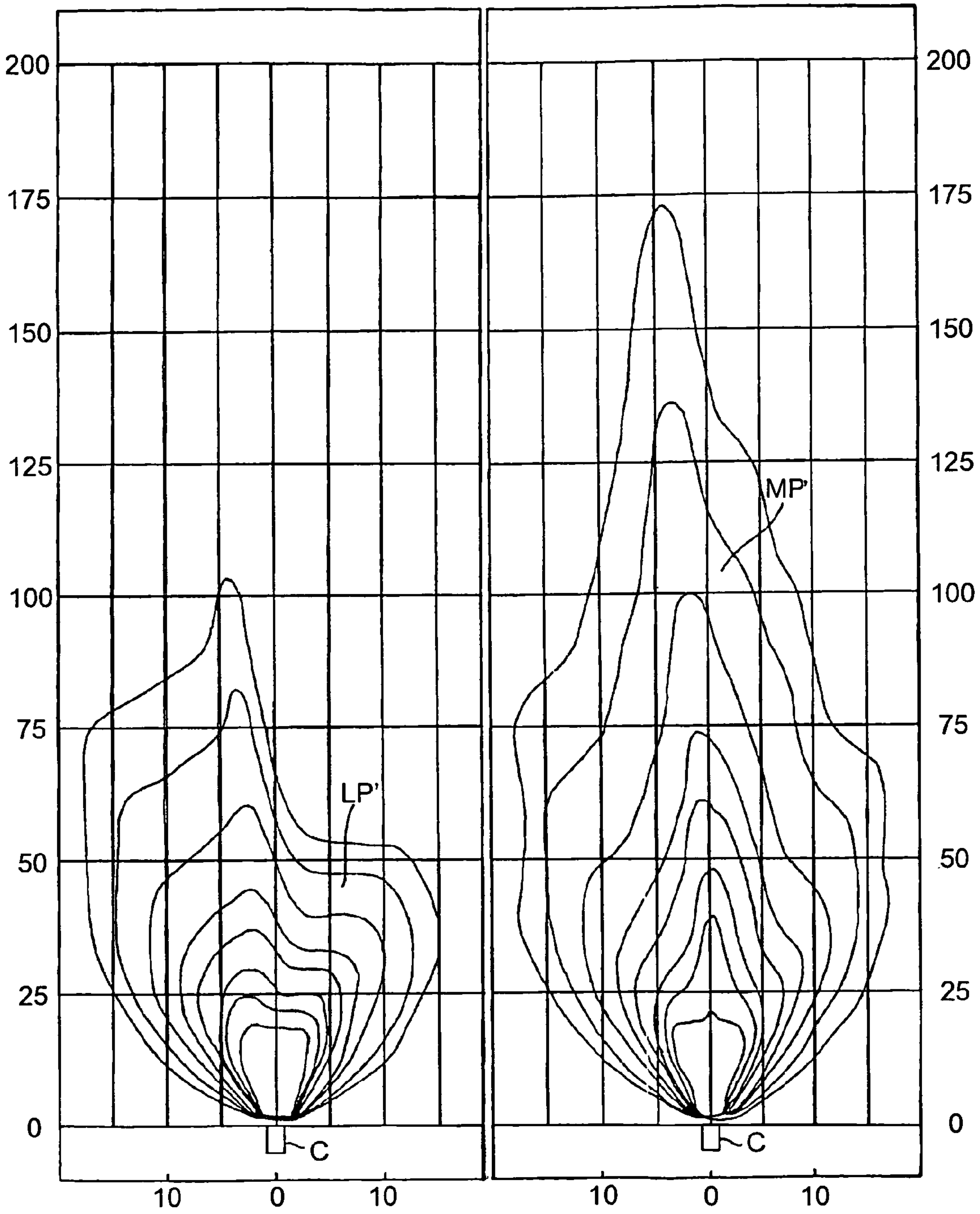
FIG. 13A is a plan explanatory diagram of an equiluminous curve of light, in which an optimum low-beam light distribution pattern on the road obtained by computer simulation is shown in a simplified manner.
FIG. 13B is a plan explanatory diagram of an equiluminous curve of light, in which an optimum motorway light distribution pattern on the road obtained by computer simulation is shown in a simplified manner.

FIG. 13A is a plan explanatory diagram of an equiluminous curve of light, in which an optimum low-beam light distribution pattern LP' on the road obtained by computer simulation is shown in a simplified manner. In the pattern LP', the equiluminous curve at the center indicates 100 (lx), and the other equiluminous curve respectively indicate 70 (lx), 50 (lx), 30 (lx), 20 (lx), 10 (lx), 5 (lx), and 3 (lx) toward the outside. FIG. 13B is a plan explanatory diagram of an equiluminous curve of light, in which an optimum motorway light distribution pattern MP' on the road obtained by computer simulation is shown in a simplified manner. In the pattern MP', the equiluminous curve at the center indicates 100 (lx), and the other equiluminous curves respectively indicate 70 (lx), 50 (lx), 30 (lx), 20 (lx), 10 (lx), 5 (lx), and 3 (lx) toward the outside. The digits in FIGS. 12 and 13 are in meters.

Returning to FIGS. 1 and 2, a headlamp 1 according to the first embodiment of the present invention is, for example, a projector-type headlamp. The headlamp 1 includes a discharge lamp 2 as a light source, a main reflector 3, a projection lens (condenser lens) 4, a shading unit 5, a sub-reflector 6, and a switching unit 7.

The discharge lamp 2 is a so-called high-pressure metal vapor discharge lamp such as a metal halide lamp, a high intensity discharge lamp (HID), or the like. The discharge lamp 2 is detachably fitted via a socket mechanism 8 to the main reflector 3. A light emitting part 9 of the discharge lamp 2 is positioned near a first focal point F1 of a main reflection surface 10 of the reflector 3.

Aluminum deposition, silver painting, or the like is applied to an inner surface of the main reflector 3 to form the main reflection surface 10. The main reflector 3 is formed in a shape of an ellipsoid of revolution. The main reflection surface 10 is formed of a reflection surface such that the vertical section of in FIG. 1 forms an ellipsoid, and the horizontal section in FIG. 2 forms a paraboloid or a deformed paraboloid. As a result, the main reflection surface 10 has the first focal point F1 and a second focal point (focal line on the horizontal section) F2. The main reflector 3 is fixed and held by a holder (frame) 11. The main reflection surface 10 reflects and uses a part of light (light L1 shown by arrow with broken line in FIG. 2) of the lights L1 and L2 from the discharge lamp 2, as shown in FIG. 2, as the low-beam light distribution pattern LP shown in FIGS. 8A and 9A, and as a far-side light distribution pattern shown in FIGS. 8B and 9B, that is, the motorway light distribution pattern MP. Accordingly, of L1 and L2 from the discharge lamp 2, light (light L2 shown by arrow with solid line in FIG. 2) other than the light L1 reflected by the main reflection surface 10 normally becomes useless.

Figure 8A:
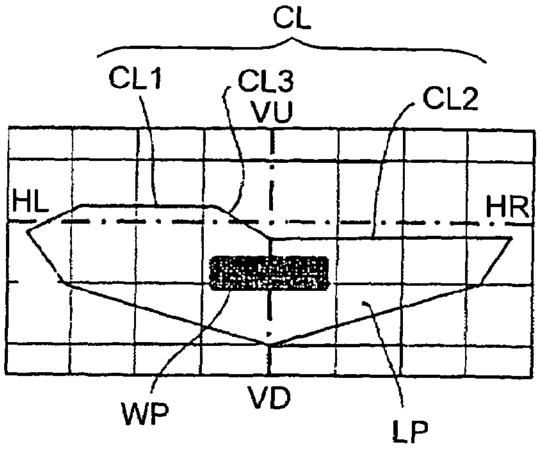
FIG. 8A is an illustration of a low-beam light distribution pattern and a diffused light distribution on a screen.
Figure 8B:
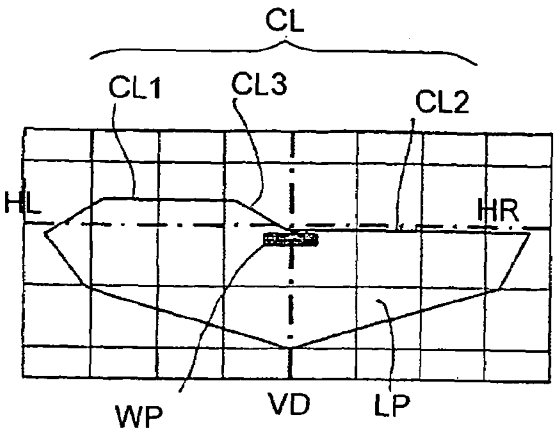
FIG. 8B an illustration of a motorway light distribution pattern and a condensed light distribution pattern.
Figure 9A:
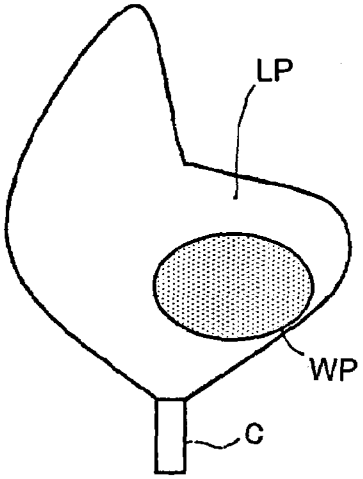
FIG. 9A is an illustration of the low-beam light distribution pattern and the diffused light distribution pattern on the road.
Figure 9B:
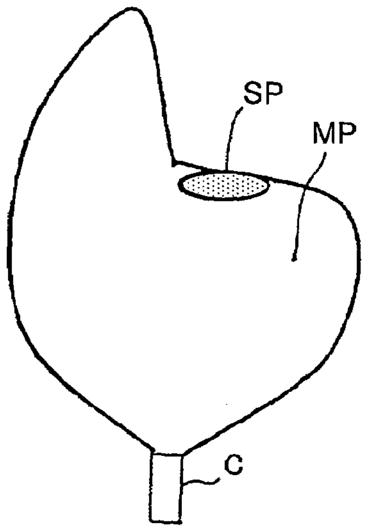
FIG. 9B is an illustration of the schematic motorway light distribution pattern and the condensed light distribution pattern on the road.

The projection lens 4, though not shown, has a focal plane (meridional image surface) on an object space side on the front F of the second focal point F2. The projection lens 4 is fixed and held by the holder 11. The projection lens 4 is for projecting reflected light L3 (see FIG. 2) from the main reflection surface 10, and more specifically, reflected light L4 (see FIG. 2) other than the reflected light cut off by the shading unit 5, forward toward outside as the low-beam light distribution pattern LP and the motorway light distribution pattern MP. The low-beam light distribution pattern LP and the motorway light distribution pattern MP have, as shown in FIGS. 8 and 9, different positions in vertical direction of a cut-off line CL (CL1, CL2, and CL3). That is, the cut-off line CL of the low-beam light distribution pattern LP is positioned at a position lower than the cut-off line CL of the motorway light distribution pattern MP. The vertical difference between the cut-off line CL in the low-beam light distribution pattern LP and the cut-off line CL of the motorway light distribution pattern MP is about 0.3 degree in view of the light distribution on the screen shown in FIGS. 8A and 8B.

The shading unit 5 cuts off a part of the reflected light L3 reflected by the main reflection surface 10 and respectively forms the low-beam light distribution pattern LP and the motorway light distribution pattern MP with remaining reflected light L4. The shading unit 5 includes, as shown in FIGS. 1 to 7, two movable shades 12 and 13 arranged in front and behind in the Z direction of an optical axis of the main reflection surface 10. Edges 14 and 15 forming the cut-off line CL of the low-beam light distribution pattern LP and the cut-off line CL of the motorway light distribution pattern MP are respectively formed on the upper edges of two movable shades 12 and 13. These edges 15 and 15 have a slant stepped portion of about 30 degrees in the. middle, and level portions vertically on different levels right and left of the stepped portion. Accordingly, as shown in FIGS. 8A and 8B, a left upper horizontal cut-off line CL1, a right lower horizontal cut-off line CL2, and a central slant cut-off line CL3 are respectively formed in the low-beam light distribution pattern LP and the motorway light distribution pattern MP.

The shading unit 5 is arranged near the second focal point F2 of the main reflection surface 10, so as to be able to change the posture. That is, the shading unit 5 is rotatably held by the holder 11 via a rotary shaft 17, so as to be able to rotate on a rotation axis O of the rotary shaft 17. Accordingly, as shown in FIG. 3, the shading unit 5 is turned to a low-beam posture (a posture shown by solid line in FIGS. 1 to 3). The edges 14 and 15 of the two movable shades 12 and 13 in the low-beam posture are substantially positioned on the optical axis Z—Z of the main reflection surface 10, and positioned further away from the second focal point F2 of the main reflection surface 10 than the edge 14 in the motorway posture. Therefore, generation of a spectral color in the cut-off line CL of the low-beam light distribution pattern LP can be prevented and the vicinity of the cut-off line CL can be shaded off by the action of the two blade edges 14 and 15 away from the second focal point F2. Since the edges 14 and 15 are positioned on the upper side than the edges 14 and 15 in the motorway posture, the cut-off line CL of the low-beam light distribution pattern LP can be positioned at a position lower than the cut line CL of the motorway light distribution pattern MP. Accordingly, the low-beam light distribution pattern LP obtained by the shading unit 5 in the low-beam posture is suitable for normal traveling of the car C.

Figure 1:
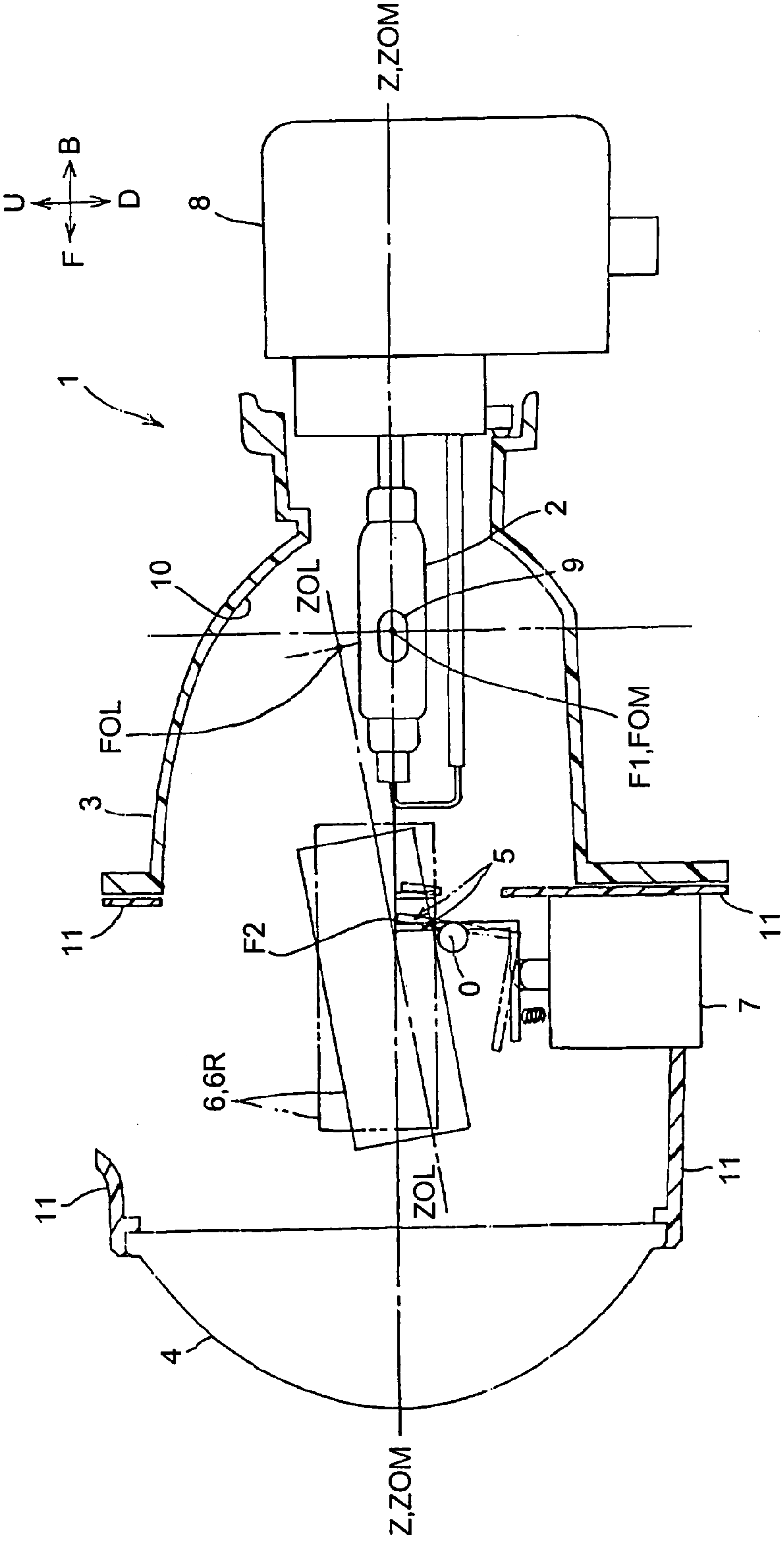
FIG. 1 is a vertical cross-section of relevant parts of a vehicle headlamp according to a first embodiment of the present invention.
Figure 2:
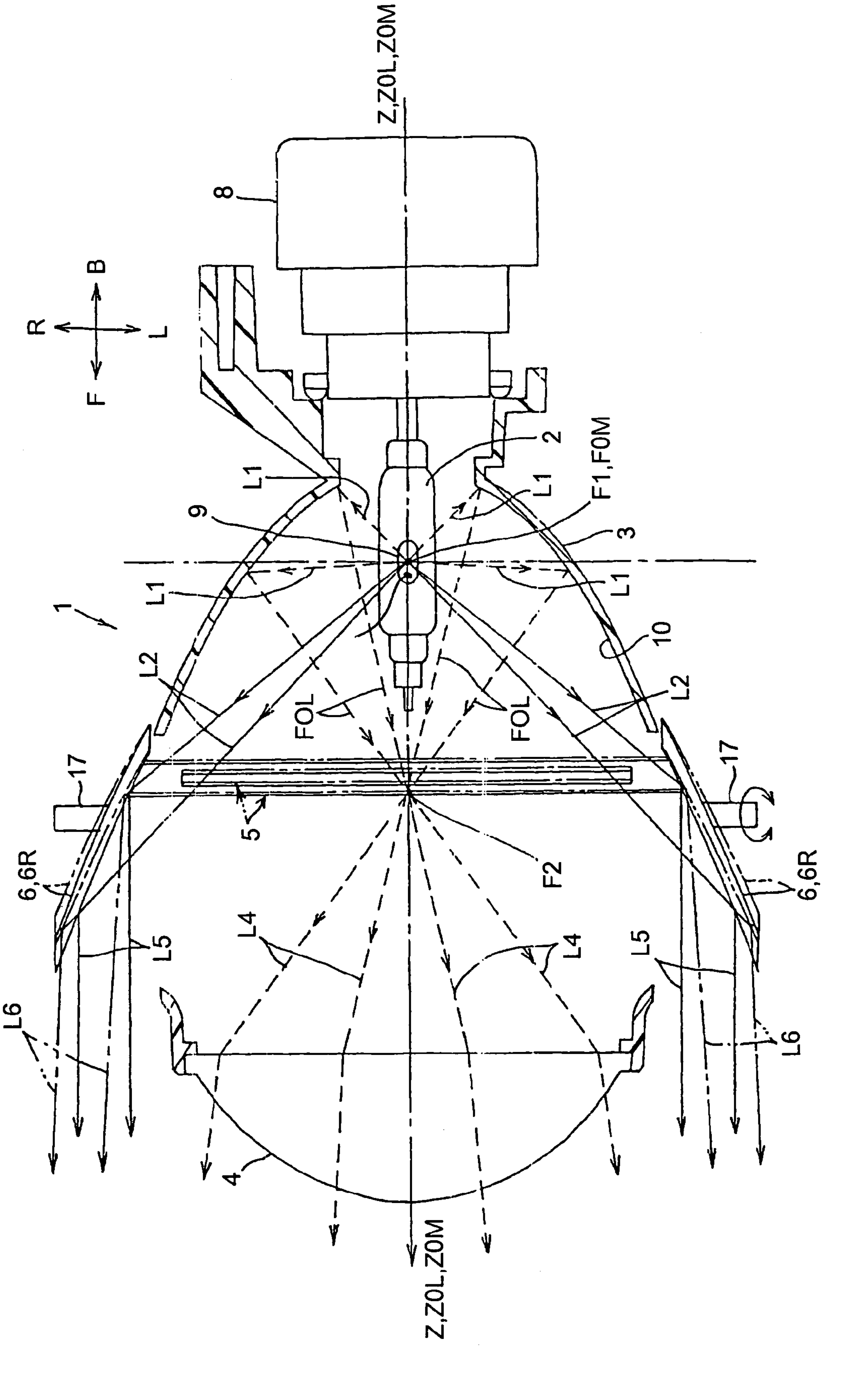
FIG. 2 is a horizontal cross-section of the headlamp shown in FIG. 1.
Figure 3:
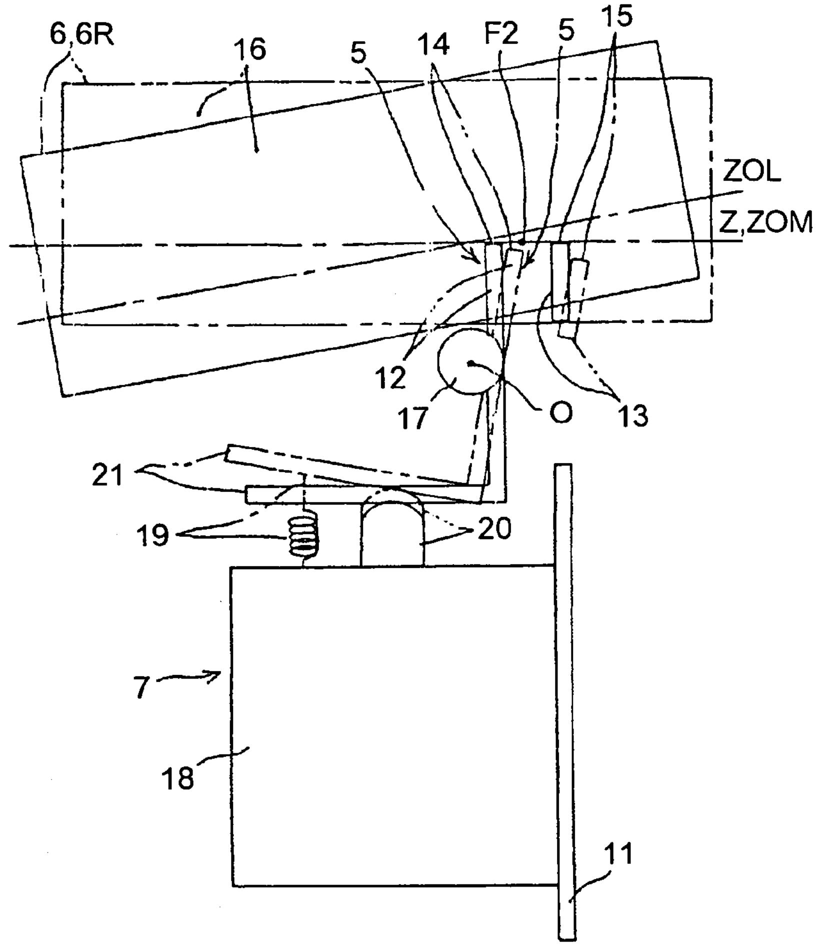
FIG. 3 is a side elevation of a low-beam posture and a motorway posture of integrally formed shading unit and sub-reflector.
Figure 4:
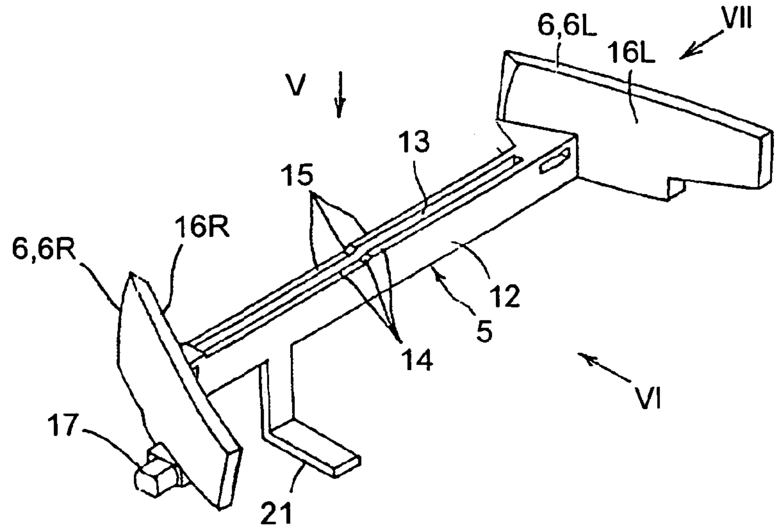
FIG. 4 is a perspective view of the shading unit and the sub-reflector.
Figure 5:
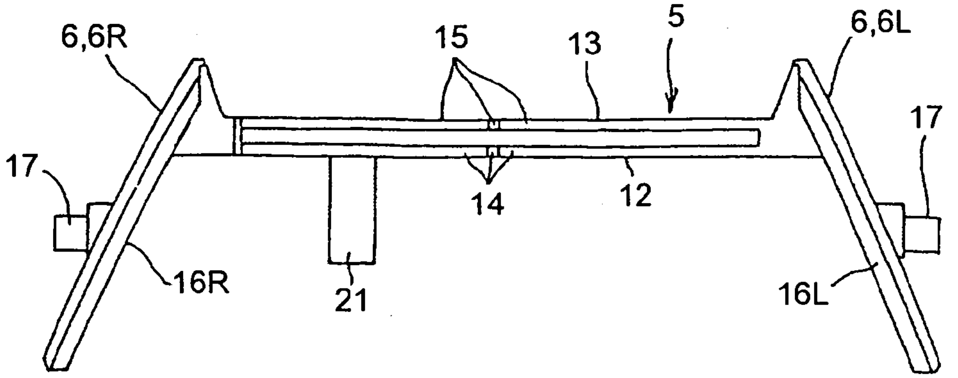
FIG. 5 is a view in the direction of arrow V in FIG. 4.
Figure 6:
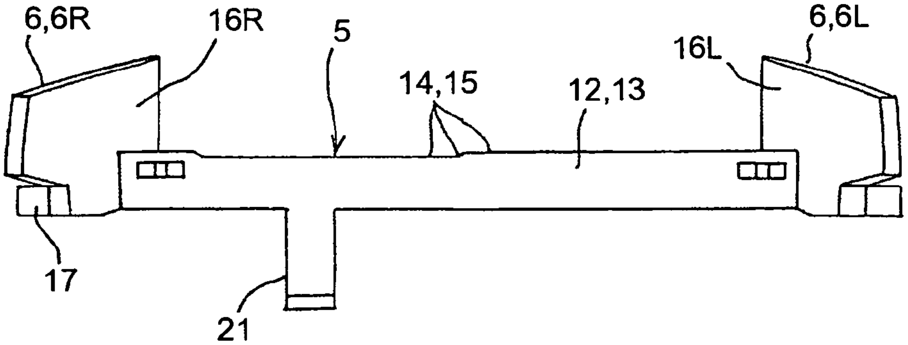
FIG. 6 is a view in the direction of arrow VI in FIG. 4.
Figure 7:
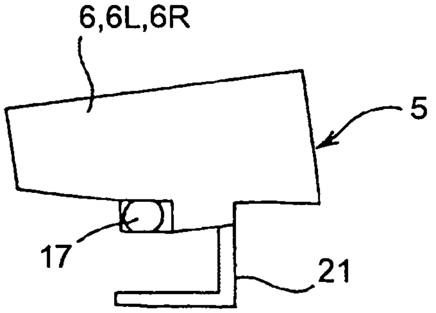
FIG. 7 is a view in the direction of arrow VII in FIG. 4.

On the other hand, the shading unit 5 is turned to a motorway posture (a posture shown by two-dot chain line in FIGS. 1 to 3). The edges 14 and 15 of the two movable shades 12 and 13 in the motorway posture are, tilted down obliquely backward with respect to the optical axis Z—Z of the main reflection surface 10. The edge 14 of one of the two movable shades 12 and 13, in this example, of the movable shade 12, is closer to the second focal point F2 of the main reflection surface 10 than the edges 14 and 15 in the low-beam posture. Accordingly, the vicinity of the cut-off line CL of the motorway light distribution pattern MP can be made sharp by the action of the one-blade edge 14 adjacent to the second focal point F2. That is, a sharp focused cut-off line CL, which is effective at the time of traveling at a high speed from the standpoint of visibility and prevention of glare, can be obtained. Since the edge 14 in the motorway posture is positioned at a position lower than the edges 14 and 15 in the low-beam posture, the cut-off line CL of the motorway light distribution pattern MP can be positioned at a position higher than the cut-off line CL of the low-beam light distribution pattern LP. Accordingly, the motorway light distribution pattern MP obtained by the shading unit 5 in the motorway posture is suitable for traveling of the car C at high speed. If the shading unit 5 is positioned at a position lower than that in the motorway posture, for example, at a position in the high-beam posture, almost all or all of the reflected light L3 from the main reflection surface 10 is not cut off. Accordingly, when the shading unit 5 is positioned in the high-beam posture, since almost all or all of the reflected light L3 from the main reflection surface 10 is directly irradiated from the projection lens 4 forward to the outside, the high-beam light distribution pattern having no cut-off line, as shown in Japanese Patent Application Laid-Open No. 2002-324413, can be obtained.

The sub-reflector 6 includes a left sub-reflector 6L and a right sub-reflector 6R having a substantially rectangular shape with the vertical width being about 20 millimeters. Aluminum deposition, silver painting, or the like is applied to the inner depressed surface of the sub-reflector 6 (the left side sub-reflector 6L and the right side sub-reflector 6R), and sub-reflection surfaces 16L and 16R, being NURBS curved surfaces based on a paraboloid of revolution in which the vicinity of the first focal point F1 of the main reflection surface 10 is designated as focal points FOL and FOM, are respectively formed. The sub-reflection surfaces 16L and 16R of the sub-reflector 6 (6L and 6R) effectively reflect and use the light L2 of the lights L1 and L2 from the discharge lamp 2, which normally becomes useless.

The sub-reflector 6 is respectively arranged on the right and left sides between the opening edge of the main reflector 3 and the edge of the projection lens 4, so as to be able to change the posture. That is, the sub-reflector 6 is rotatably held by the holder 11 via the rotary shaft 17 so as to be able to rotate on the rotation axis O. Accordingly, as shown in FIG. 3, the sub-reflector 6 is turned to a low-beam posture (a posture shown by solid line in FIGS. 1 to 3). The sub-reflector 6 is then positioned, tilted down obliquely forward with respect to the optical axis Z—Z of the main reflection surface 10. An optical axis Z0L—Z0L of the sub-reflection surfaces 16L and 16R in the low-beam posture is positioned likewise, tilted down obliquely forward with respect to the optical axis Z—Z of the main reflection surface 10. Furthermore, a focal point FOL of the sub-reflection surfaces 16L and 16R in the low-beam posture is positioned ahead of the focal point F0L of the sub-reflection surfaces 16L and 16R in the motorway posture and away from the first focal point F1 of the main reflection surface 10. Therefore, the useless light L2 from the discharge lamp 2 is reflected by the sub-reflection surfaces 16L and 16R tilted down obliquely forward, and the reflected light L5 thereof (see FIG. 2) is irradiated forward to the outside, and hence, the diffused light distribution pattern WP shown in FIGS. 8A, 9A, 10A, and 12A can be obtained. Since the diffused light distribution pattern WP illuminates the road on the near side for a wide range, an optimum low-beam light distribution pattern LP' (see FIGS. 11A and 13A) suitable for normal traveling of the car C can be obtained by superposing it on the low-beam light distribution pattern LP. The optimum low-beam light distribution pattern LP' can illuminate the road of from about 10 to 20 meters ahead of the car C with the wide range light distribution pattern, and powerful light distribution can be obtained as the low-beam light distribution.

On the other hand, the sub-reflector 6 is turned to the motorway posture (a posture shown by two-dot chain line in FIGS. 1 to 3). The sub-reflector 6 is then positioned substantially parallel to the optical axis Z—Z of the main reflection surface 10. An optical axis Z0M—Z0M of the sub-reflection surfaces 16L and 16R in the motorway posture is positioned substantially parallel to the optical axis Z—Z of the main reflection surface 10. Furthermore, the focal point F0M of the sub-reflection surfaces 16L and 16R in the motorway posture is positioned behind of the focal point F0L of the sub-reflection surfaces 16L and 16R in the low-beam posture and near the first focal point F1 of the main reflection surface 10. Accordingly, since the useless light L2 from the discharge lamp 2 is reflected by the substantially parallel sub-reflection surfaces 16L and 16R, and the reflected light L6 thereof (see FIG. 2) is irradiated forward to the outside, the condensed light distribution pattern SP shown in FIGS. 8B, 9B, 10B, and 12B can be obtained. Since the condensed light distribution pattern SP illuminates the road on the far side in a relatively narrow range with high intensity of light (with high illuminance), an optimum motorway light distribution pattern MP' (see FIGS. 11B and 13B) suitable for traveling of the car C at high speed can be obtained by superposing it on the motorway light distribution pattern MP. Since the shading unit 5 moves downward in the optimum motorway light distribution pattern MP', shortage of light near the cut-off line CL that moves upward can be supplemented by the condensed light distribution pattern SP. As shown in FIG. 11B, the highest altitude of the optimum motorway light distribution pattern MP' is equal to or higher than about 50000 (cd), and than the highest altitude of the low-beam light distribution pattern LP' (about 20000 (cd)), and is positioned substantially at the center of the horizontal line HL-HR and the vertical line VU-VD.

The shading unit 5 and the sub-reflector 6 are, as shown in FIGS. 4 to 7, integrally formed. That is, the sub-reflector 6 is integrally formed on the right and left ends of the shading unit 5. The rotary shaft 17 is integrally formed, respectively, substantially in the middle of the outside lower hem of the sub-reflector 6. An extension 21 in an L shape as seen from the side is integrally formed at the lower hem of the right end of the front movable shade 12. The integrally formed shading unit 5 and sub-reflector 6 are respectively held by the holder 11 rotatably about the rotation axis O, so as to be able to change the posture. The integrally formed shading unit 5 and sub-reflector 6 are switched to the low-beam posture or the motorway posture at the same time by the switching unit 7. On the other hand, the rotation axis O of the rotary shaft 17 is positioned ahead of the first focal point F1 of the main reflection surface 10 and the focal points F0L and F0M of the sub-reflection surfaces 16L and 16R, and is positioned on the downside D of the optical axis Z—Z of the main reflection surface 10 and the optical axes Z0L—Z0L and Z0M—Z0M of the sub-reflection surfaces 16L and 16R. Furthermore, the rotation axis O of the rotary shaft 17 has a torsional position that does not cross the optical axis Z—Z of the main reflection surface 10 and the optical axes Z0L—Z0L and Z0M—Z0M of the sub-reflection surfaces 16L and 16R.

The switching unit 7 includes, as shown in FIG. 3, a solenoid 18 and a return spring (tension spring) 19. The solenoid 18 is fixed to the holder 11, facing the lower face of the extension 21. The opposite ends of the return spring 19 are respectively fixed to the upper face of the solenoid 18 and the extension 21. Accordingly, the point of a moving rod (plunger) 20 always abuts against the lower face of the extension 18. Since the point of the moving rod 20 has a spherical shape, a deviation between the movement in a linear direction of the moving rod 20 and an arc movement of the extension 18 centering on the rotation axis O is absorbed. Accordingly, the integrally formed shading unit 5 and sub-reflector 6 can be smoothly switched to the low-beam posture or the motorway posture.

When the solenoid 18 is not energized, the integrally formed shading unit 5 and sub-reflector 6 are switched to the low-beam posture via the extension 21 due to the spring force of the return spring 19. At the same time, the moving rod 20 is in a retreated state (a state shown by solid line in FIG. 3) via the extension 21. On the other hand, when the solenoid 18 is in-the energized state, the moving rod 20 is in an advanced state (a state shown by two-dot chain line in FIG. 3) against the spring force of the return spring 19. Accordingly, the integrally formed shading unit 5 and sub-reflector 6 are switched to the motorway posture via the extension 21. Furthermore, when the solenoid 18 is switched from the energized state to the unenergized state, the return spring 19 in an extended state returns to the original state due to the returning power of the spring. Accordingly, the integrally formed shading unit 5 and sub-reflector 6 are switched to the low-beam posture via the extension 21, and at the same time, the moving rod 20 is returned to the retreated state.

The operation for obtaining the optimum low-beam light distribution pattern LP' in the car C in a normal driving condition will be explained. The solenoid 18 is turned to the unenergized state by blocking energization to the solenoid 18, in order to obtain the optimum low-beam light distribution pattern LP'. The integrally formed shading unit 5 and sub-reflector 6 are in the low-beam posture. The discharge lamp 2 is lighted in this state. A part of the light L1, of the lights L1 and L2 from the discharge lamp 2, is then reflected by the main reflection surface 10. The reflected light L3 thereof is condensed to the second focal point F2 of the main reflection surface 10. A part of the condensed reflected light L3 is cut off by the shading unit 5 in the low-beam posture. The remaining reflected light L4, which has not been cut off, passes through the second focal point F2 of the main reflection surface 10, is diffused, and irradiated forward to the outside via the projection lens 4. Accordingly, the low-beam light distribution pattern LP shown in FIGS. 8A and 9A can be obtained.

At the same time, the light of the light L1 and L2 from the discharge lamp 2, which is not reflected by the main reflection surface 10 and normally becomes useless, that is, the useless light L2 is reflected by the sub-reflection surfaces 16L and 16R of the sub-reflector 6 in the low-beam posture. Since the reflected light L5 is irradiated forward to the outside, the diffused light distribution pattern WP shown in FIGS. 8A, 9A, 10A, and 12A can be obtained. As shown in the figures, the diffused light distribution pattern WP becomes an effective light distribution pattern for the low-beam light distribution pattern LP, since the diffused light distribution pattern WP illuminates the road on the near side for a wide range.

The optimum low-beam light distribution pattern LP' shown in FIGS. 11A and 13A can be obtained by superposing the diffused light distribution pattern on the low-beam light distribution pattern LP. The optimum low-beam light distribution pattern LP' can illuminate the road on the near side for a wide range, it is most suitable at the time of normal traveling of the car C and is desired in view of the traffic safety.

The operation for obtaining the optimum motorway light distribution pattern MP' in the car C in a high-speed driving state will be explained. The solenoid 18 is energized to become the energized state, in order to obtain the optimum motorway light distribution pattern MP'. The integrally formed shading unit 5 and sub-reflector 6 are switched to the motorway posture. The discharge lamp 2 is lighted in this state. A part of the light L1, of the light L1 and L2 from the discharge lamp 2, is reflected by the main reflection surface 10. The reflected light L3 thereof is condensed to the second focal point F2 of the main reflection surface 10. A part of the condensed reflected light L3 is cut off by the shading unit 5 in the motorway posture. The remaining reflected light L4, which has not been cut off, passes through the second-focal point F2 of the main reflection surface 10, is diffused, and irradiated forward to the outside via the projection lens 4. Accordingly, the motorway light distribution pattern MP shown in FIGS. 8B and 9B can be obtained.

At the same time, the light of the light L1 and L2 from the discharge lamp 2, which is not reflected by the main reflection surface 10 and normally becomes useless, that is, the useless light L2 is reflected by the sub-reflection surfaces 16L and 16R of the sub-reflector 6 in the motorway posture. The reflected light L5 is irradiated forward to the outside, to obtain the condensed light distribution pattern SP shown in FIGS. 8B, 9B, 10B, and 12B. As shown in these figures, the condensed light distribution pattern SP becomes an effective light distribution pattern for the motorway light distribution pattern MP, since the condensed light distribution pattern SP illuminates the road on the far side in a relatively narrow range with high intensity of light (with high illuminance).

The optimum motorway light distribution pattern MP' shown in FIGS. 11B and 13B can be obtained by superposing the motorway light distribution pattern MP on the condensed light distribution pattern SP. The optimum motorway light distribution pattern MP' can illuminate the road on the far side in a relatively narrow range with high intensity of light (with high illuminance), and hence, it is suitable at the time of high-speed driving of the car C, and it is desired in view of the traffic safety.

The headlamp 1 can effectively use the light L2, of the light L1 and L2 from the discharge lamp 2, which normally becomes useless, by converting it to the diffused light distribution pattern WP effective for the low-beam light distribution pattern LP, and the condensed light distribution pattern SP effective for the motorway light distribution pattern MP by the sub-reflection surfaces 16L and 16R of the sub-reflector 6, that is, sub-reflectors 6L and 6R. Therefore, at the time of normal driving of the car C, since the headlamp 1 can obtain the optimum low-beam light distribution pattern LP' obtained by superposing the diffused light distribution pattern WP on the low-beam light distribution pattern LP, it can illuminate the road on the near side for a wide range, which is desirable in view of the traffic safety. On the other hand, at the time of high-speed driving of the car C, since the headlamp 1 can obtain the optimum motorway light distribution pattern MP' by superposing the condensed light distribution pattern SP on the motorway light distribution pattern MP, it can illuminate the road on the far side for a wide range with high intensity of light (with high illuminance), which is desirable in view of the traffic safety.

Particularly, the headlamp 1 uses two front and rear movable shades 12 and 13 as the shading unit 5, and when the shading unit 5 is in the low-beam posture, the edges 14 and 15 of the two movable shades 12 and 13 are substantially positioned on the optical axis Z—Z of the main reflection surface 10, and away from the second focal point F2 of the main reflection surface 10 than the edge 14 in the motorway posture. Therefore, the headlamp 1 can prevent generation of a spectral color in the cut-off line CL of the low-beam light distribution pattern LP by the action of the two-blade edges 14 and 15 away from the second focal point F2 of the main reflection surface 10 and the vicinity of the cut-off line CL can be shaded off. Furthermore, since the edges 14 and 15 in the low-beam posture are positioned at a position higher than the edges 14 and 15 in the motorway posture, the cut-off line CL of the low-beam light distribution pattern LP can be positioned at a position lower than the cut-off line CL of the motorway light distribution pattern MP. Accordingly, the low-beam light distribution pattern LP obtained by the shading unit 5 in the low-beam posture is suitable for normal driving of the car C.

On the other hand, in the headlamp 1, when the shaking unit 5 is in the motorway posture, the edge 14 of the front movable shade 12, of the two movable shades 12 and 13, is made closer to the second focal point F2 of the main reflection surface 10 than the edges 14 and 15 in the low-beam posture. Therefore, in the headlamp 1 according to the first embodiment, the vicinity of the cut-off line CL of the motorway light distribution pattern MP can be made sharp by the action of the one-blade edge 14 adjacent to the second focal point F2 of the main reflection surface 10. Furthermore, since the edge 14 in the motorway posture is positioned at a position lower than the edges 14 and 15 in the low-beam posture, the cut-off line CL of the motorway light distribution pattern MP can be positioned at a position higher than the cut-off line CL of the low-beam light distribution pattern LP. Accordingly, the motorway light distribution pattern MP obtained by the shading unit 5 in the motorway posture is suitable for high-speed driving of the car C.

In the headlamp 1, the shading unit 5 and the sub-reflector 6 are formed integrally, and the switching unit 7 is a common switching unit that switches the integrally formed shading unit 5 and sub-reflector 6 to the low-beam posture or the motorway posture at the same time. Accordingly, according to the headlamp 1, the number of parts can be reduced, thereby reducing the cost, as compared to the one that switches the shading unit 5 and the sub-reflector 6 by a separate switching unit.

Furthermore, in the headlamp 1, the rotation axis O of the rotary shaft 17 for switching the integrally-formed shading unit 5 and sub-reflector 6 to the low-beam posture or the motorway posture is positioned ahead of the first focal point F1 of the main reflection surface 10 and the focal point F0 of the sub-reflection surfaces 16L and 16R, and at a position lower than the optical axis Z—Z of the main reflection surface 10 and the optical axes Z0L—Z0L and Z0M—Z0M of the sub-reflection surfaces 16L and 16R, and further has a torsional position that does not cross the optical axis Z—Z of the main reflection surface 10 and the optical axes Z0L—Z0L and Z0M—Z0M of the sub-reflection surfaces 16L and 16R. Accordingly, in the headlamp 1, by switching the integrally formed shading unit 5 and sub-reflector 6 to the low-beam posture or to the motorway posture about the rotation axis O of the rotary shaft 17, the low-beam light distribution pattern LP, the diffused light distribution pattern WP, the motorway light distribution pattern MP, the condensed light distribution pattern SP, the optimum low-beam light distribution pattern LP', and the optimum motorway light distribution pattern MP' can be obtained simply but reliably, and efficiently.

In other words, the shading unit 5 and the sub-reflector 6 in the low-beam posture are rotated about the rotation axis O of the rotary shaft 17 to switch the posture to the motorway posture. The edge 14 in the motorway posture is then positioned at a position lower than the edges 14 and 15 of the low-beam posture and close to the second focal point F2 of the main reflection surface 10 simply, reliably, and efficiently. Furthermore, the optical axis Z0M—Z0M of the sub-reflection surfaces 16L and 16R in the motorway posture is positioned substantially in parallel to the optical axis Z—Z of the main reflection surface 10 simply, reliably, and efficiently. The focal point F0M of the sub-reflection surfaces 16L and 16R in the motorway posture is positioned behind the focal point F0L of the sub-reflection surfaces 16L and 16R in the low-beam posture and close to the first focal point F1 of the main reflection surface 10 simply, reliably, .and efficiently. Conversely, the shading unit 5 and the sub-reflector 6 in the motorway posture are rotated about the rotation axis O of the rotary shaft 17 to switch the posture to the low-beam posture. The edges 14 and 15 in the low-beam posture are then positioned at a position higher than the edge 14 of the motorway posture and away from the second focal point F2 of the main reflection surface 10 simply, reliably, and efficiently. Furthermore, the optical axis Z0L—Z0L of the sub-reflection surfaces 16L and 16R in the low-beam posture is positioned, tilted down obliquely forward with respect the optical axis Z—Z of the main reflection surface 10 simply, reliably, and efficiently. The focal point F0L of the sub-reflection surfaces 16L and 16R in the low-beam posture is positioned ahead of the focal point F0M of the sub-reflection surfaces 16L and 16R in the motorway posture and away from the first focal point F1 of the main reflection surface 10 simply, reliably, and efficiently.

Figure 14:
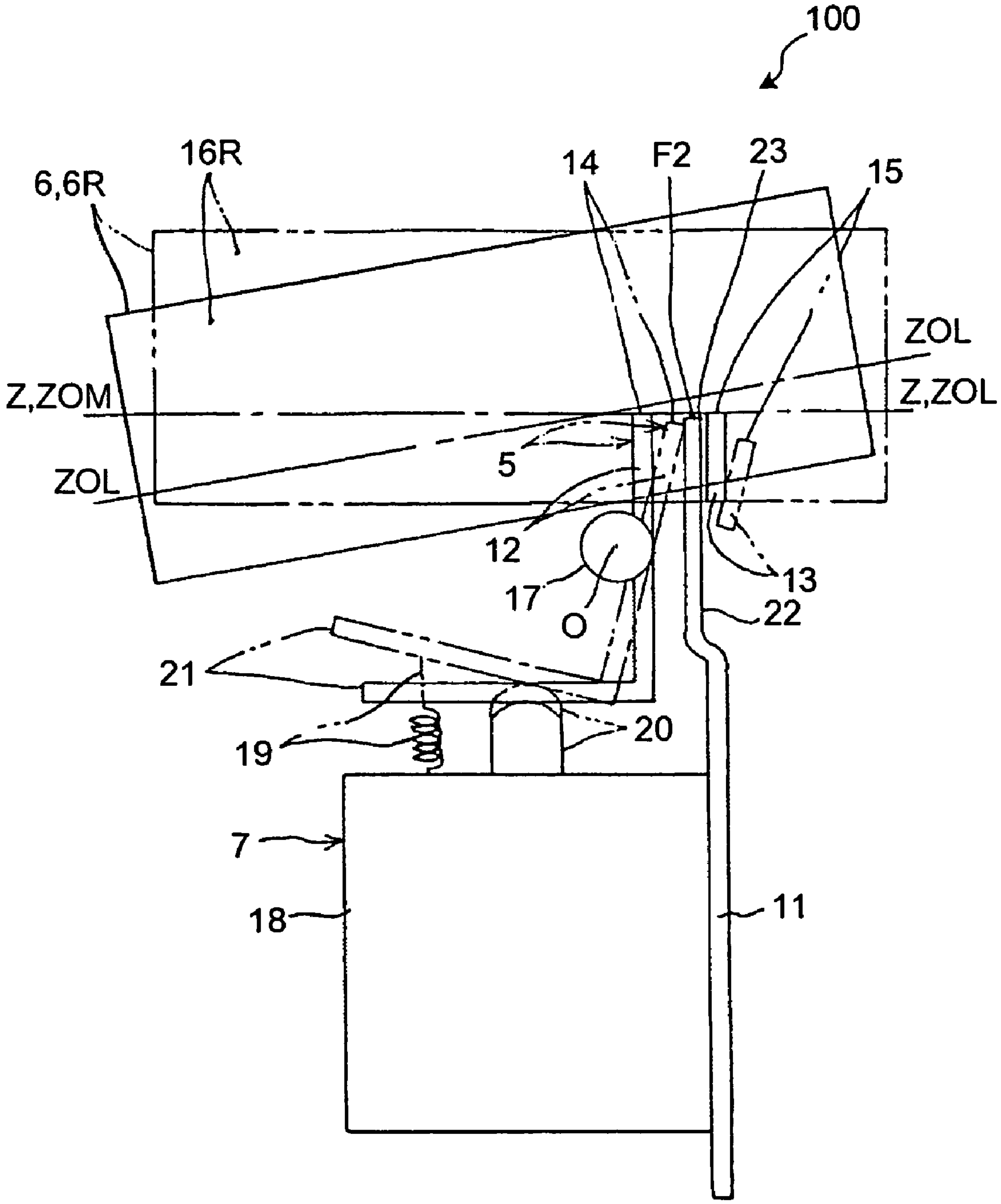
FIG. 14 is a side elevation of a shading unit, a sub-reflector, and a switching unit according to a second embodiment of the present invention.

A headlamp 100 according to a second embodiment will be explained below with reference to FIG. 14. Like reference signs as in FIGS. 1 to 13 are designated with like parts having the same configuration.

In the headlamp 100, the shading unit 5 includes two movable shades 12 and 13 arranged front and behind, and one fixed shade 22 arranged between the two movable shades 12 and 13. The edge of the fixed shade 22 is closer to the second focal point F2 of the main reflection surface 10 than the two movable shades 12 and 13. When the two movable shades 12 and 13 are in the low-beam posture (a state shown by solid line in FIG. 14), the edges 14 and 15 of the two movable shades 12 and 13 are positioned substantially on the optical axis Z—Z of the main reflection surface 10, and positioned at a higher position than the edge 23 of the fixed shade 22, and away from the second focal point F2 of the main reflection surface 10. By the edges 14 and 15 of the two movable shades 12 and 13 in the low-beam posture, the cut-off line CL of the low-beam light distribution pattern LP is formed. On the other hand, when the two movable shades 12 and 13 are in the motorway posture (a state shown by two-dot chain line in FIG. 14), the edges 14 and 15 of the two movable shades 12 and 13 are positioned, tilted down obliquely backward with respect to the optical axis Z—Z of the main reflection surface 10, and positioned at a lower position than the edge 23 of the fixed shade 22 and away from the second focal point F2 of the main reflection surface. When the two movable shades 12 and 13 are in the motorway posture, the cut-off line CL of the motorway light distribution pattern MP is formed by the edge 23 of the one fixed shade 22.

The headlamp 100 can achieve the action and the effect substantially similar to those of the headlamp 1. Particularly, the headlamp 100 forms the motorway light distribution pattern MP by the one fixed shade 22, and the cut-off line CL of the motorway light distribution pattern MP is formed by the edge 23 of the one fixed shade 22. Therefore, the headlamp 100 can form the motorway light distribution pattern MP and the cut-off line CL of the motorway light distribution pattern MP simply and efficiently with high accuracy.

In the first embodiment, two movable shades 12 and 13 are used as the shading unit 5. However, only one movable shade having a plate thickness substantially the same as the width of the two movable shades 12 and 13 (the sum of the plate thickness of the two movable shades 12 and 13 and the distance between the two movable shades 12 and 13) can be used.

In the first and the second embodiments, the discharge lamp 2 is used as the light source. However, a halogen lamp can be used instead of the discharge lamp 2.

In the first and the second embodiments, the integrally formed shading unit 5 and sub-reflector 6 are switched to the low-beam posture or to the motorway posture by one common switching unit 7. However, the shading unit 5 and the sub-reflector 6 may be separately formed, and respectively switched to the low-beam posture or to the motorway posture by separate switching units.

In the first and the second embodiments, the shading unit 5 and the sub-reflector 6 are rotated on the rotation axis O of the rotary shaft 17 to switch to the low-beam posture or to the motorway posture. However, the shading unit 5 and the sub-reflector 6 can be linearly shifted to switch to the low-beam posture or to the motorway posture.

In the first and the second embodiments, the sub-reflector 6 has a rectangular shape with the vertical width of about 20 millimeters. However, the shape and the size of the sub-reflector are not particularly limited. However, it requires a sub-reflection surface based on a paraboloid of revolution having focal points F0L and F0M near the first focal point F1 of the main reflection surface 10.

In the first and the second embodiments, the motorway light distribution pattern MP is used as a light distribution pattern for far side. However, the traveling light distribution pattern may be used as the light distribution pattern for the far side. The motorway light distribution pattern MP is, as shown in the first and the second embodiments, a light distribution pattern formed by reflected light L3 from the main reflection surface 10, a part of which is cut off by the shading unit 5, wherein the cut-off line CL is positioned at a position higher than the cut-off line CL of the low-beam light distribution pattern LP, to illuminate the road on the far side, without causing glare. This light distribution pattern is suitable when the car C is traveling on a motorway where the car C comes across oncoming cars and preceding cars. On the other hand, the traveling light distribution pattern is, as shown in Japanese Patent Application Laid-Open No. 2002-324413, a light distribution pattern formed by directly using the reflected light L3 from the main reflection surface 10 with cutting off almost none or totally none of the reflected light L3, which has no cut-off line, and can illuminate the road on much farther. Accordingly, this light distribution pattern is suitable when the car C is traveling on a motorway where there is few oncoming or preceding cars.

Furthermore, in the first and the second embodiments, the amount of switching by the shading unit 5 between the low-beam posture and the motorway posture, and the amount of switching by the sub-reflector 6 between the low-beam posture and the motorway posture can be set as desired depending on the car C in which the headlamp is to be used.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector-type headlamp comprising:

a light source that outputs light;

a main reflection surface in a form of an ellipsoid of revolution, wherein the main reflection surface reflects a part of the light output by the light source, the main reflection surface having a first focal point and a second focal point;

the light source arranged near the first focal point;

a shading unit that is located near the second focal point, wherein the shading unit is movable between a first posture and a second posture, wherein a low-beam light distribution pattern is formed when the shading unit is in the first posture and a high-beam light distribution pattern with the remaining reflected light is formed when the shading unit is in the second posture;

a projection lens that projects forward the low-beam light distribution pattern and the high-beam light distribution pattern;

a sub-reflector that is arranged between the main reflector and the projection lens and has a sub-reflection surface in a form of a paraboloid of revolution with a point near the first focal point as a focal point, wherein the sub-reflector reflects a part of light, which does not enter into the main reflection surface and normally becomes useless, from the light source, and the sub-reflector is movable between a third posture and a fourth posture, wherein a diffused light distribution pattern is formed and superposed on the low-beam light distribution pattern projected forward from the projection lens when the sub-reflector is in the third posture and a condensed light distribution pattern is formed and superposed on the high-beam light distribution pattern projected forward from the projection lens when the sub-reflector is in the fourth posture; and a switching unit that performs switching of the shading unit between the first posture and the second posture and switching of the sub-reflector between the third posture and the fourth posture, wherein the shading unit and the sub-reflector are formed integrally, and the switching unit commonly and simultaneously performs switching of the shading unit and the sub-reflector.

2. The headlamp according to claim 1, wherein the shading unit includes two movable shades arranged side-by-side, wherein each of the movable shades is movable between the first posture and the second posture, when the movable shades are in the first posture, edges of the movable shades form a cut-off line of the low-beam light distribution pattern, when the movable shades are in the second posture, an edge of one of the movable shades forms a cut-off line of the high-beam light distribution pattern, and when one of the movable shades is in the second posture and other of the movable shades is in the first posture, an edge of one of the movable shades that is in the second posture is located at a lower position than an edge of the movable shades that is in the first posture and close to the second focal point.

3. The headlamp according to claim 1, wherein the shading unit includes two movable shades arranged side-by-side and one fixed shade arranged in between the two movable shades, wherein each of the movable shades is movable between the first posture and the second postures, when the movable shades are in the first posture, edges of the movable shades form a cut-off line of the low-beam light distribution pattern, when the movable shades are in the second posture, an edge of the fixed shade forms a cut-off line of the high-beam light distribution pattern, and when the movable shades are in the first posture, the edge of the fixed shade is located at a lower position than the edges of the movable shades that are in the first posture and close to the second focal point.

4. The headlamp according to claim 1, wherein the sub-reflector comprises a first sub-reflector and a second sub-reflector that are arranged at different locations between the main reflection surface and the projection lens, the first sub-reflector and the second sub-reflector movable between the third posture and the fourth posture, optical axes of the first sub-reflector and the second sub-reflector are directed down obliquely forward when the first sub-reflector and the second sub-reflector are in the third posture than when the first sub-reflector and the second sub-reflector are in the fourth posture, and when the first sub-reflector and the second sub-reflector in the fourth posture, focal points of the first sub-reflector and the second sub-reflector are positioned behind focal points of the first sub-reflector and the second sub-reflector when the first sub-reflector and the second sub-reflector are in the first posture, and close to the first focal point.

5. A projector-type headlamp comprising:

a light source that outputs light;

a main reflection surface in a form of an ellipsoid of revolution, wherein the main reflection surface reflects a part of the light output by the light source, the main reflection surface having a first focal point and a second focal point;

the light source arranged near the first focal point;

a shading unit that is located near the second focal point, wherein the shading unit is movable between a first posture and a second posture, wherein a low-beam light distribution pattern is formed when the shading unit is in the first posture and a high-beam light distribution pattern with the remaining reflected light is formed when the shading unit is in the second posture;

a projection lens that projects forward the low-beam light distribution pattern and the high-beam light distribution pattern;

a sub-reflector that is arranged between the main reflector and the projection lens and has a sub-reflection surface in a form of a paraboloid of revolution with a point near the first focal point as a focal point, wherein the sub-reflector reflects a part of light, which does not enter into the main reflection surface and normally becomes useless, from the light source, and the sub-reflector is movable between a third posture and a fourth posture, wherein a diffused light distribution pattern is formed and superposed on the low-beam light distribution pattern projected forward from the projection lens when the sub-reflector is in the third posture and a condensed light distribution pattern is formed and superposed on the high-beam light distribution pattern projected forward from the projection lens when the sub-reflector is in the fourth posture; and a switching unit that performs switching of the shading unit between the first posture and the second posture and switching of the sub-reflector between the third posture and the fourth posture, wherein the shading unit is rotatably held on a rotary shaft, so as to rotate and to be switched between the first posture and the second posture, and a rotation axis of the rotary shaft is positioned ahead of the first focal point and the focal point of the sub-reflection surfaces, at a position lower than an optical axis of the main reflection surface and an optical axis of the sub-reflection surfaces, and has a torsional position that does not cross the optical axis of the main reflection surface and the optical axis of the sub-reflection surfaces.

6. A projector-type headlamp comprising:

a light source that outputs light;

a main reflection surface in a form of an ellipsoid of revolution, wherein the main reflection surface reflects a part of the light output by the light source, the main reflection surface having a first focal point and a second focal point;

the light source arranged near the first focal point;

a shading unit that is located near the second focal point, wherein the shading unit is movable between a first posture and a second posture, wherein a low-beam light distribution pattern is formed when the shading unit is in the first posture and a high-beam light distribution pattern with the remaining reflected light is formed when the shading unit is in the second posture;

a projection lens that projects forward the low-beam light distribution pattern and the high-beam light distribution pattern;

a sub-reflector that is arranged between the main reflector and the projection lens and has a sub-reflection surface in a form of a paraboloid of revolution with a point near the first focal point as a focal point, wherein the sub-reflector reflects a part of light, which does not enter into the main reflection surface and normally becomes useless, from the light source, and the sub-reflector is movable between a third posture and a fourth posture, wherein a diffused light distribution pattern is formed and superposed on the low-beam light distribution pattern projected forward from the projection lens when the sub-reflector is in the third posture and a condensed light distribution pattern is formed and superposed on the high-beam light distribution pattern projected forward from the projection lens when the sub-reflector is in the fourth posture; and a switching unit that performs switching of the shading unit between the first posture and the second posture and switching of the sub-reflector between the third posture and the fourth posture, wherein the sub-reflector unit is rotatably held on a rotary shaft, so as to rotate and to be switched between the third posture and the fourth posture, and a rotation axis of the rotary shaft is positioned ahead of the first focal point and the focal point of the sub-reflection surfaces, at a position lower than an optical axis of the main reflection surface and an optical axis of the sub-reflection surfaces, and has a torsional position that does not cross the optical axis of the main reflection surface and the optical axis of the sub-reflection surfaces.

7. A projector-type headlamp comprising;

a light source that outputs light;

a main reflection surface in a form of an ellipsoid of revolution, wherein the main reflection surface reflects a part of the light output by the light source, the main reflection surface having a first focal point and a second focal point;

the light source arranged near the first focal point;

a shading unit that is located near the second focal point, wherein the shading unit is movable between a first posture and a second posture, wherein a low-beam light distribution pattern is formed when the shading unit is in the first posture and a high-beam light distribution pattern with the remaining reflected light is formed when the shading unit is in the second posture;

a projection lens that projects forward the low-beam light distribution pattern and the high-beam light distribution pattern;

a sub-reflector that is arranged between the main reflector and the projection lens and has a sub-reflection surface in a form of a paraboloid of revolution with a point near the first focal point as a focal point, wherein the sub-reflector reflects a part of light, which does not enter into the main reflection surface and normally becomes useless, from the light source, and the sub-reflector is movable between a third posture and a fourth posture, wherein a diffused light distribution pattern is formed and superposed on the low-beam light distribution pattern projected forward from the projection lens when the sub-reflector is in the third posture and a condensed light distribution pattern is formed and superposed on the high-beam light distribution pattern projected forward from the projection lens when the sub-reflector is in the fourth posture; and a switching unit that performs switching of the shading unit between the first posture and the second posture and switching of the sub-reflector between the third posture and the fourth posture, wherein the shading unit and the sub-reflector are formed integrally and are rotatably held on a rotary shaft, so as to rotate and to be switched between the first posture, the second posture, the third posture, and the fourth posture, and a rotation axis of the rotary shaft is positioned ahead of the first focal point and the focal point of the sub-reflection surfaces, at a position lower than the optical axis of the main reflection surface and the optical axis of the sub-reflection surfaces, and has a torsional position that does not cross the optical axis of the main reflection surface and the optical axis of the sub-reflection surfaces, and the switching unit simultaneously performs switching of the shading unit and the sub-reflector.

* * * * *